(12) United States Patent
Ohira

(10) Patent No.: US 12,505,816 B2
(45) Date of Patent: Dec. 23, 2025

(54) ELECTRO-OPTICAL DEVICE AND DISPLAY DEVICE

(71) Applicant: Magnolia White Corporation, Tokyo (JP)

(72) Inventor: Hirofumi Ohira, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/991,906

(22) Filed: Dec. 23, 2024

(65) Prior Publication Data
US 2025/0210007 A1   Jun. 26, 2025

(30) Foreign Application Priority Data
Dec. 26, 2023   (JP) ................... 2023-219369

(51) Int. Cl.
*G09G 3/36* (2006.01)

(52) U.S. Cl.
CPC ....... *G09G 3/3696* (2013.01); *G09G 2310/08* (2013.01); *G09G 2320/041* (2013.01); *G09G 2320/068* (2013.01)

(58) Field of Classification Search
CPC ......... G09G 2310/08; G09G 2320/041; G09G 2320/068; G09G 3/3696
See application file for complete search history.

(56) References Cited

U.S. PATENT DOCUMENTS

| | | | | |
|---|---|---|---|---|
| 2007/0040780 A1* | 2/2007 | Gass | ................ | G02F 1/134363 345/87 |
| 2007/0109246 A1* | 5/2007 | Tanaka | ................ | G09G 3/3648 345/98 |
| 2014/0292833 A1* | 10/2014 | Matsushima | ........ | G09G 3/3648 345/89 |
| 2021/0195714 A1* | 6/2021 | Woodgate | ................ | G09G 3/20 |
| 2021/0333580 A1 | 10/2021 | Matsushima | | |
| 2022/0155622 A1* | 5/2022 | Murata | ............. | G02F 1/133746 |
| 2023/0079179 A1 | 3/2023 | Matsushima | | |
| 2023/0324730 A1 | 10/2023 | Matsushima | | |
| 2024/0257775 A1* | 8/2024 | Masuda | ............ | G02F 1/134372 |
| 2024/0264476 A1 | 8/2024 | Matsushima | | |

FOREIGN PATENT DOCUMENTS

JP   2021173938 A   11/2021

* cited by examiner

*Primary Examiner* — Hong Zhou
(74) *Attorney, Agent, or Firm* — Maier & Maier, PLLC

(57) ABSTRACT

An electro-optical device includes a first liquid crystal layer positioned between a first electrode and a second electrode, a temperature sensor, and a control circuit. When switching from a first mode to a second mode, the control circuit determines a first potential difference and a second potential difference based on the temperature detected by the temperature sensor, the second potential difference having a magnitude different from the magnitude of the first potential difference, outputs a first start voltage that causes the first potential difference to be generated between the first and second electrodes, and outputs a first drive voltage that causes the second potential difference to be generated between the first and second electrodes at or after a time point when a first time has elapsed since a time point when the output of the first start voltage is started.

8 Claims, 10 Drawing Sheets

FIG.1
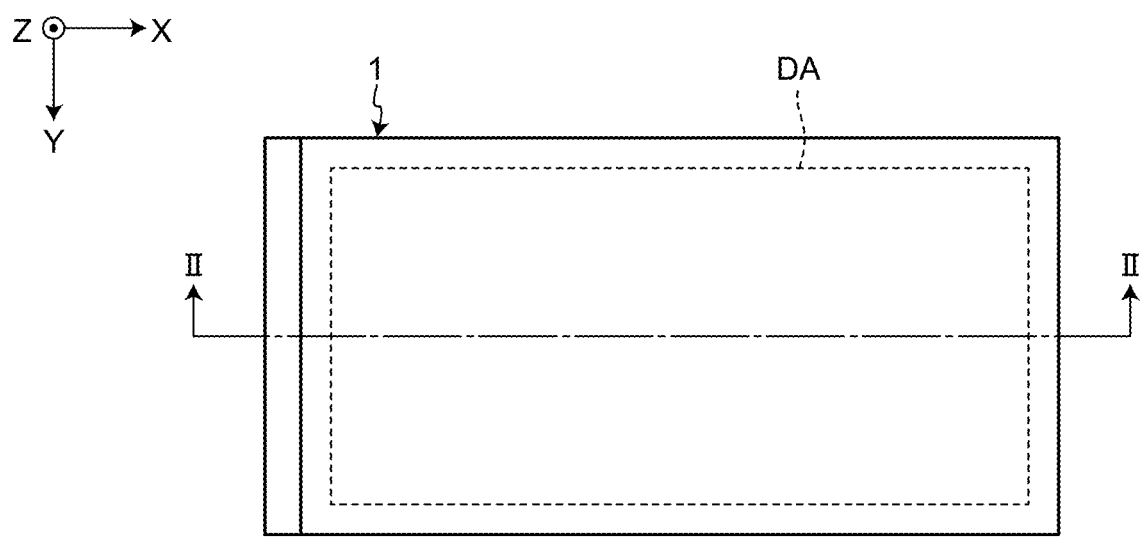
M1
M2

ELECTRO-OPTICAL DEVICE AND DISPLAY DEVICE

CROSS-REFERENCE TO RELATED APPLICATION

This application claims the benefit of priority from Japanese Patent Application No. 2023-219369 filed on Dec. 26, 2023, the entire contents of which are incorporated herein by reference.

BACKGROUND

1. Technical Field

The present disclosure relates to an electro-optical device and a display device.

2. Description of the Related Art

Japanese Patent Application Laid-open Publication No. 2021-173938 (JP-A-2021-173938) discloses a display system including a view angle control panel that includes a liquid crystal layer including a twisted nematic element (liquid crystal molecules) and controls the view angle of a display surface. The display system of JP-A-2021-173938 is mounted, for example, on a vehicle. The view angle control panel (example of an electro-optical device) controls the view angle of a display region as the liquid crystal molecules operate. This switches a visible state in which a person on the driver seat can visually recognize an image and a non-visible state in which the person on the driver seat cannot visually recognize the image.

However, when the temperature of the liquid crystal layer is relatively low, the operation time of the liquid crystal molecules becomes relatively slow, potentially preventing early switching from the visible state to the non-visible state. In this case, an image not to be visually recognized by the person on the driver seat is potentially visually recognized by the person.

For the foregoing reasons, there is a need for an electro-optical device capable of preventing an image not to be visually recognized by a person from being visually recognized by the person even when the temperature of a liquid crystal layer is relatively low.

SUMMARY

According to an aspect, an electro-optical device includes a first substrate including a first electrode, a second substrate including a second electrode and disposed facing the first substrate, the second electrode facing the first electrode, a first liquid crystal layer positioned between the first electrode and the second electrode, a temperature sensor configured to detect the temperature of the first liquid crystal layer, and a control circuit configured to operate in one of a first mode in which the potential difference between the first electrode and the second electrode is set to zero and a second mode in which a potential difference larger than zero is generated between the first electrode and the second electrode, wherein when switching from the first mode to the second mode, the control circuit determines a first potential difference and a second potential difference based on the temperature detected by the temperature sensor, the second potential difference having a magnitude different from the magnitude of the first potential difference, outputs a first start voltage that causes the first potential difference to be generated between the first and second electrodes, and outputs a first drive voltage that causes the second potential difference to be generated between the first and second electrodes at or after a time point when a first time has elapsed since a time point when the output of the first start voltage is started.

BRIEF DESCRIPTION OF THE DRAWINGS

FIG. 1 is a plan view of a display device according to a first embodiment;

DETAILED DESCRIPTION

Figure 2:
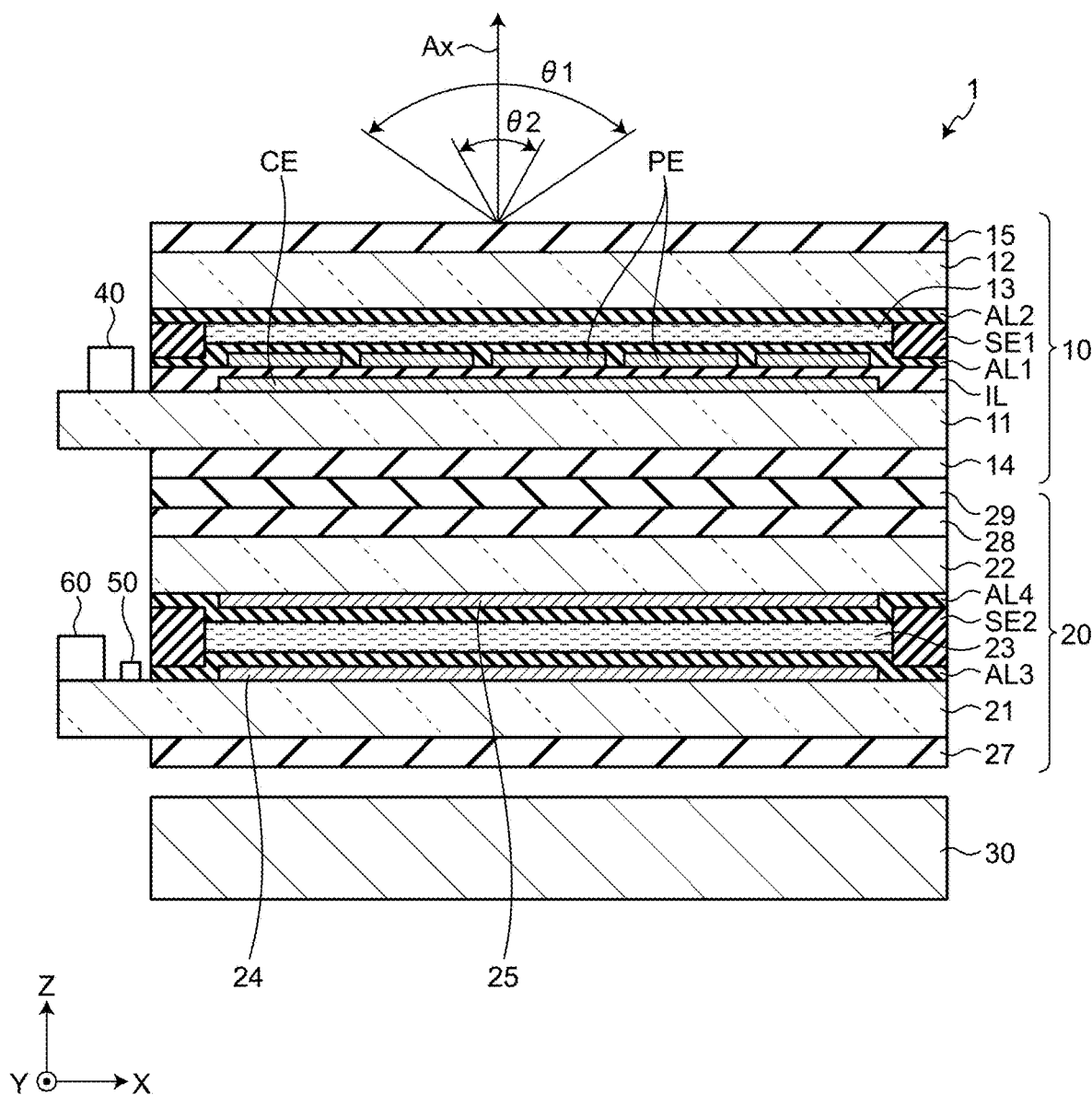
FIG. 2 is a sectional view of the display device along line II-II illustrated in FIG. 1.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

An X direction and a Y direction illustrated in the drawings correspond to directions orthogonal to each other and parallel to a principal surface (for example, front surface) of a substrate included in a display device 1. A positive X side and a negative X side in the X direction and a positive Y side and a negative Y side in the Y direction correspond to sides of the display device 1. A Z direction corresponds to a direction orthogonal to a principal surface of the substrate included in the display device 1, a positive Z side in the Z direction corresponds to a front surface side on which an image is displayed in the display device 1, and a negative Z side in the Z direction corresponds to a back surface side of the display device 1. In the present specification, a "plan view" is a view of the display device 1 in the Z direction from one of the positive Z side and the negative Z side. A plane orthogonal to the Z direction is referred to as an "XY plane". The X, Y, and Z directions are exemplary, and the present disclosure is not limited to these directions.

First Embodiment

FIG. 1 is a plan view of the display device 1 according to a first embodiment. A rectangular display region DA in which an image is displayed is provided at the front surface of the display device 1.

The display device 1 is mounted on, for example, a vehicle and attached at a position where a person M1 on the driver seat and a person M2 on the front passenger seat can visually recognize the display region DA of the display device 1. The person M1 on the driver seat is positioned on the negative X side of the display device 1. The person M2 on the front passenger seat is positioned at a position overlapping the display device 1 in the Z direction, specifically, in front of the display device 1. The positions of the persons M1 and M2 relative to the display device 1 are not limited to the above-described positions.

FIG. 2 is a sectional view of the display device 1 along line II-II illustrated in FIG. 1. The display device 1 includes a display panel 10, a view angle control panel 20 that is an electro-optical device, and a backlight unit 30. The display panel 10, the view angle control panel 20, and the backlight unit 30 are disposed in the stated order from the positive Z side toward the negative Z side. The display panel 10 and the view angle control panel 20 are bonded to each other.

The display panel 10 is a transmissive liquid crystal display of a horizontal electric field scheme (for example, a fringe field switching (FFS) scheme). The display panel 10 may be driven by an IPS scheme other than the FFS scheme or by a vertical electric field scheme such as a twisted nematic (TN) scheme or a vertical alignment (VA) scheme.

The display panel 10 includes a first display substrate 11, a second display substrate 12 disposed facing the first display substrate 11, and a display liquid crystal layer 13 between the first display substrate 11 and the second display substrate 12.

The first display substrate 11 is positioned on the back surface side of the second display substrate 12. An insulating film IL and an alignment film AL1 are stacked in the stated order on the front surface side of the first display substrate 11. The alignment film AL1 contacts the display liquid crystal layer 13.

A common electrode CE is disposed between the first display substrate 11 and the insulating film IL. A plurality of pixel electrodes PE are disposed between the insulating film IL and the alignment film AL1.

The pixel electrodes PE overlap the display region DA in a plan view. The pixel electrodes PE each overlap the common electrode CE in a plan view. The pixel electrodes PE and the common electrode CE apply voltage to the display liquid crystal layer 13.

An alignment film AL2 is disposed on the back surface side of the second display substrate 12. The alignment film AL2 contacts the display liquid crystal layer 13.

The display panel 10 further includes a seal SE1 that seals liquid crystal molecules in the display liquid crystal layer 13. The display panel 10 also includes a first polarization plate 14 and a second polarization plate 15. The first polarization plate 14 is disposed on the back surface side of the first display substrate 11. The second polarization plate 15 is disposed on the front surface side of the second display substrate 12.

The front surface of the second polarization plate 15 corresponds to the front surface of the display device 1. The transmission axis of the first polarization plate 14 is orthogonal to the Z direction, and the transmission axis of the second polarization plate 15 is orthogonal to each of the Z direction and the transmission axis of the first polarization plate 14.

Only a main part of the display panel 10 is illustrated in a simplified manner in FIG. 2, and the display panel 10 also includes non-illustrated members. The second display substrate 12 includes, for example, a light-shielding layer, a color filter layer, an overcoat layer, and a spacer. The first display substrate 11 includes, for example, a plurality of scanning lines, a plurality of signal lines, switching elements electrically coupled to the respective pixel electrodes PE, and various insulating films.

Figure 3:
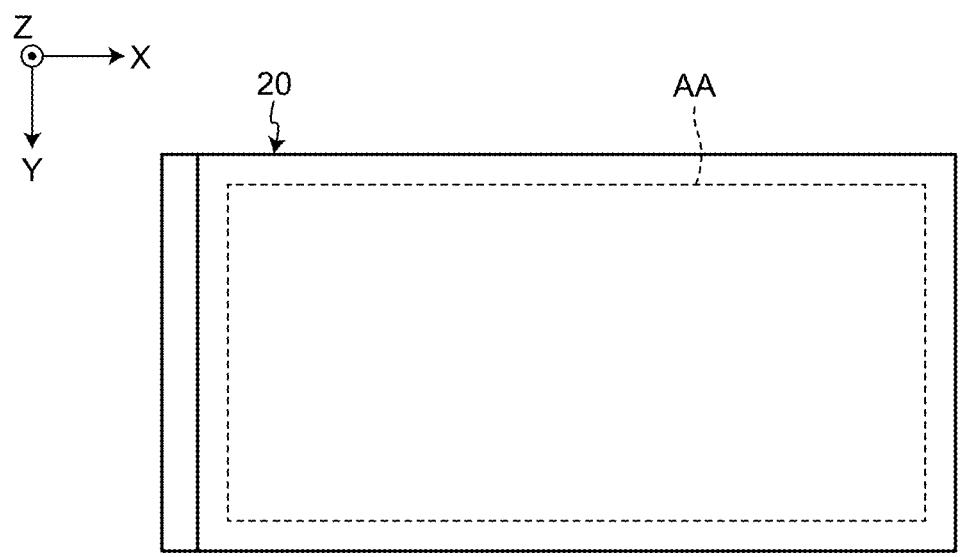
FIG. 3 is a plan view of a view angle control panel.

FIG. 3 is a plan view of the view angle control panel 20. The view angle control panel 20 entirely overlaps the display region DA in a plan view. The view angle control panel 20 adjusts, in an effective region AA, the view angle of the display region DA in the X direction. The effective region AA overlaps the display region DA in a plan view.

The view angle is an angle with which an image displayed in the display region DA can be visually recognized by the persons M1 and M2. The view angle is an X-directional view angle and, as illustrated in FIG. 2, expressed by using an X-directional tilt angle indicating a tilt to both sides in the X direction with respect to a reference axis Ax in a direction (parallel to the Z direction in the present embodiment) orthogonal to a principal surface (for example, the front surface) of a substrate to be described later, which is included in the view angle control panel 20, with a reference point as an optional point in the display region DA.

In the present first embodiment, the view angle control panel 20 switches a first view angle θ1 with which an image displayed in the display region DA can be visually recognized by both the person M1 on the driver seat and the person M2 on the front passenger seat and a second view angle θ2 with which the image cannot be visually recognized by the person M1 on the driver seat but can be recognized by the person M2 on the front passenger seat (to be described later in detail).

The view angle control panel 20 is a liquid crystal panel of a vertical electric field scheme (for example, the TN scheme). As illustrated in FIG. 2, the view angle control panel 20 includes a first control board 21, a second control board 22 disposed facing the first control board 21, and a first control liquid crystal layer 23 positioned between the first control board 21 and the second control board 22.

The first control board 21 is positioned on the back surface side of the second control board 22. An alignment film AL3 and a first electrode 24 are disposed on the front surface side of the first control board 21. The alignment film AL3 contacts the first control liquid crystal layer 23. The first electrode 24 has a single-sheet shape and is disposed between the first control board 21 and the alignment film AL3. The first electrode 24 overlaps the effective region AA in a plan view.

An alignment film AL4 and a second electrode 25 are disposed on the back surface side of the second control board 22. The alignment film AL4 contacts the first control liquid crystal layer 23.

The second electrode 25 is disposed between the second control board 22 and the alignment film AL4. The second electrode 25 is disposed facing the first electrode 24. The second electrode 25 overlaps the effective region AA in a plan view.

The first display substrate 11, the second display substrate 12, the first control board 21, and the second control board 22 are made of, for example, glass or resin and are translucent. The common electrode CE, the pixel electrodes PE, the first electrode 24, and the second electrode 25 are made of a conductive material such as indium tin oxide (ITO) or indium zinc oxide (IZO) and are translucent. The alignment films AL1, AL2, AL3, and AL4 are horizontal alignment films having alignment regulation force parallel to the XY plane.

The view angle control panel 20 further includes a seal SE2 that seals liquid crystal molecules in the first control liquid crystal layer 23. The first control liquid crystal layer 23 has optical rotatory power that rotates the polarization axis of a polarization component of linearly polarized light as described later.

The view angle control panel 20 also includes a third polarization plate 27, a fourth polarization plate 28, and a polarization axis rotation element 29. The third polarization plate 27 is disposed on the back surface side of the first control board 21. The fourth polarization plate 28 is disposed on the front surface side of the second control board 22. The polarization axis rotation element 29 is disposed on the front surface side of the fourth polarization plate 28.

The transmission axis of the third polarization plate 27 is orthogonal to the Z direction. The transmission axis of the fourth polarization plate 28 is orthogonal to each of the Z direction and the transmission axis of the third polarization plate 27. The transmission axis of the fourth polarization plate 28 and the transmission axis of the first polarization plate 14 are positioned at mutually different orientations about a Z axis in the Z direction.

The polarization axis rotation element 29 is an optical sheet that rotates the polarization axis of light traveling from the fourth polarization plate 28 toward the display panel 10. Light having transmitted through the fourth polarization plate 28 has a polarization axis parallel to the transmission axis of the fourth polarization plate 28. The polarization axis rotation element 29 rotates the polarization axis of the light having transmitted through the fourth polarization plate 28 so that the polarization axis aligns with the transmission axis of the first polarization plate 14.

The polarization axis rotation element 29 may be a single optical sheet or may be multilayered optical sheets. The polarization axis rotation element 29 only needs to develop a function to rotate a polarization axis and is not limited to an optical sheet, but may be an element having optical rotatory power, such as a twisted nematic liquid crystal element.

The backlight unit 30 emits light to the display panel 10 through the view angle control panel 20. The backlight unit 30 is of an edge type and includes a light source (not illustrated) and a light guiding plate (not illustrated). The light source is, for example, a light emitting diode (LED) or a fluorescent light. The light guiding plate guides light emitted from the light source so that the light is incident on the view angle control panel 20. The backlight unit 30 may be of a direct type.

The display device 1 does not necessarily need to include the backlight unit 30. In this case, the display device 1 is configured such that the display panel 10 is illuminated with natural light.

In such a display device 1, light emitted from the backlight unit 30 transmits through the view angle control panel 20 and also the display panel 10, and accordingly, an image is output to the display region DA.

The following describes operation that the view angle control panel 20 adjusts the view angle of the display region DA. The view angle control panel 20 is driven by the TN scheme as described above. The liquid crystal molecules contained in the first control liquid crystal layer 23 are in twisted alignment.

The following first describes a state in which voltage is not applied to the first control liquid crystal layer 23. In a state in which voltage is not applied to the first control liquid crystal layer 23, alignment of the liquid crystal molecules contained in the first control liquid crystal layer 23 is regulated to an initial alignment direction by the alignment films AL3 and AL4. The long axis of each liquid crystal molecule in the initial alignment direction is orthogonal to the Z direction and parallel to the XY plane.

Accordingly, the traveling direction of light does not change in the first control liquid crystal layer 23. Light having transmitted through the view angle control panel 20 transmits through the display panel 10. The view angle of the display region DA in the state in which no voltage is applied to the first control liquid crystal layer 23 is the first view angle $\theta 1$. When the view angle of the display region DA is the first view angle $\theta 1$, an image in the display region DA can be visually recognized by both the persons M1 and M2.

In a state in which voltage is applied to the first control liquid crystal layer 23, the long axis of each liquid crystal molecule contained in the first control liquid crystal layer 23 is not orthogonal to the Z direction but is tilted relative to the XY plane. As the temperature of the first control liquid crystal layer 23 decreases, speed (response speed) at which the long axis of each liquid crystal molecule rotates relative to the initial alignment direction decreases.

Since the long axis of the liquid crystal molecules is tilted (rotates), light is refracted in accordance with the tilt of the long axis of the liquid crystal molecules in the first control liquid crystal layer 23. The light refracted in the view angle control panel 20 transmits through the display panel 10. Accordingly, the view angle of the display region DA becomes the second view angle $\theta 2$ (to be described later in detail). The second view angle $\theta 2$ is smaller than the first view angle $\theta 1$. When the view angle of the display region DA becomes the second view angle $\theta 2$, an image displayed in the display region DA is visually recognizable by the person M2 positioned in front of the display device 1 but is less visually recognizable by the person M1 on the driver seat positioned on the negative X side of the display device 1.

In this manner, the view angle of the display region DA is switched by voltage applied to the first control liquid crystal layer 23 in the view angle control panel 20.

The display device 1 further includes a first control circuit 40, a temperature sensor 50, and a second control circuit 60.

The first control circuit 40 is disposed on the first display substrate 11. The first control circuit 40 controls voltage applied to the display liquid crystal layer 13 based on a pixel signal transmitted from an external device (not illustrated) and modulates the polarization component of light transmitting through the display liquid crystal layer 13 so that an image is displayed in the display region DA.

The temperature sensor 50 is disposed on the first control board 21. The temperature sensor 50 detects the temperature of the first control liquid crystal layer 23. Specifically, the temperature sensor 50 detects the temperature of the first control liquid crystal layer 23 through the alignment film AL3, the first electrode 24, and the first control board 21. The temperature detected by the temperature sensor 50 is output to the second control circuit 60.

The second control circuit 60 is disposed on the first control board 21. The second control circuit 60 controls the view angle control panel 20 based on a switching signal transmitted from the external device. The second control circuit 60 switches the view angle of the display region DA as described above by controlling voltage applied to the first control liquid crystal layer 23.

The switching signal includes a visual recognition signal with which the image displayed in the display region DA is visually recognized by both the person M1 on the driver seat and the person M2 on the front passenger seat, and a non-visual recognition signal with which the image displayed in the display region DA is not visually recognized by the person M1 on the driver seat but is visually recognized by the person M2 on the front passenger seat.

For example, in a case where a moving image is displayed in the display region DA and the person M2 on the front passenger seat does not want the moving image to be visually recognized by the person M1 on the driver seat while driving, the non-visual recognition signal is transmitted to the second control circuit 60 when the person M2 on the front passenger seat turns on a switch (not illustrated) of the external device.

When having received the visual recognition signal, the second control circuit 60 controls the view angle control panel 20 in a visual recognition mode in which the image displayed in the display region DA can be visually recognized by both the person M1 on the driver seat and the person M2 on the front passenger seat.

In the visual recognition mode, the second control circuit 60 sets the potential difference between the first electrode 24 and the second electrode 25 of the view angle control panel 20 to zero. In other words, the second control circuit 60 does not applies voltage between the first electrode 24 and the second electrode 25. Accordingly, voltage is not applied to the first control liquid crystal layer 23, and as described above, the view angle of the display region DA is the first view angle θ1 and the image displayed in the display region DA can be visually recognized by both the person M1 on the driver seat and the person M2 on the front passenger seat.

When having received the non-visual recognition signal, the second control circuit 60 controls the view angle control panel 20 in a non-visual recognition mode in which the image displayed in the display region DA cannot be visually recognized by the person M1 on the driver seat but can be visually recognized by the person M2 on the front passenger seat. In the non-visual recognition mode, the second control circuit 60 outputs voltage that generates a potential difference larger than zero between the first electrode 24 and the second electrode 25 of the view angle control panel 20, and sets the view angle of the display region DA to the second view angle θ2.

As described above, the response speed of the liquid crystal molecules decreases as the temperature of the first control liquid crystal layer 23 decreases. Accordingly, as the temperature of the first control liquid crystal layer 23 decreases, the view angle of the display region DA switches at a later time, and an image not to be visually recognized by the person M1 on the driver seat is potentially visually recognized by the person M1 on the driver seat. Thus, to switch the view angle of the display region DA early, the second control circuit 60 adjusts the potential difference between the first electrode 24 and the second electrode 25 as described next.

Figure 4:
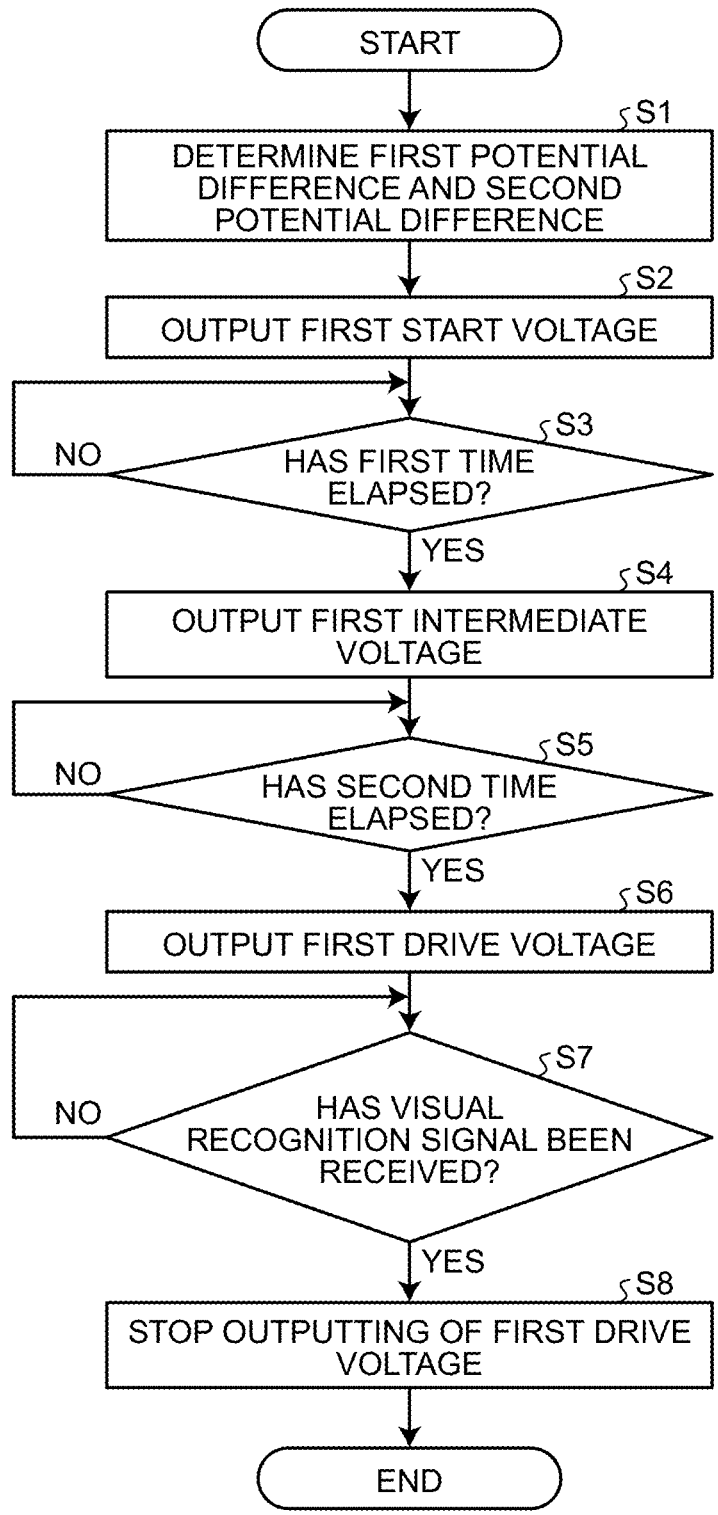
FIG. 4 is a flowchart executed by a second control circuit at switching from a visual recognition mode to a non-visual recognition mode.

FIG. 4 is a flowchart executed by the second control circuit 60 at switching from the visual recognition mode to the non-visual recognition mode. When having received the non-visual recognition signal while operating in the visual recognition mode, the second control circuit 60 switches from the visual recognition mode to the non-visual recognition mode and executes the flowchart of FIG. 4.

At step S1, the second control circuit 60 determines a first potential difference D1 and a second potential difference D2 based on the temperature detected by the temperature sensor 50.

Figure 5:
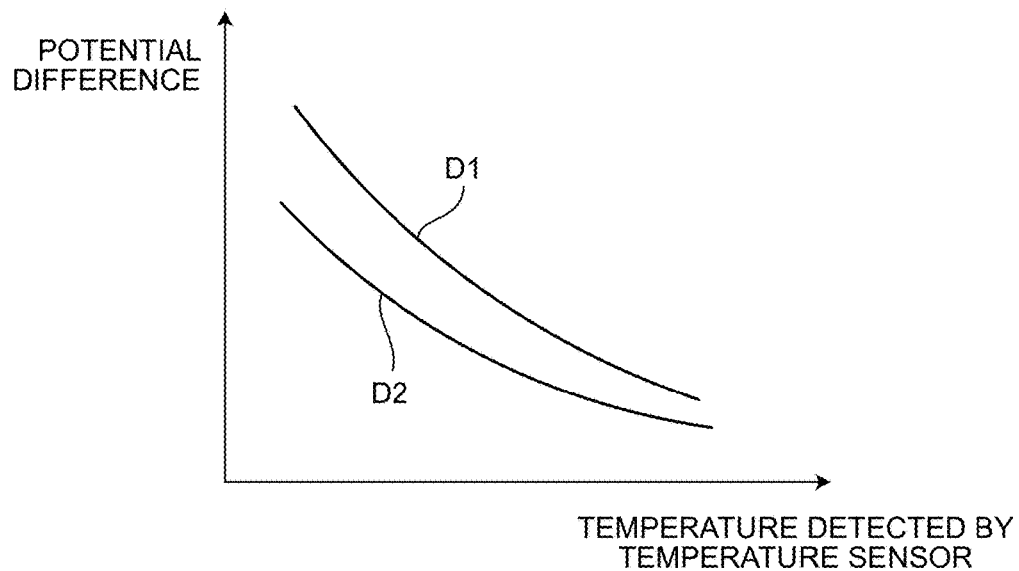
FIG. 5 is a diagram illustrating a first correlation between each of first and second potential differences and a temperature detected by a temperature sensor.

FIG. 5 is a diagram illustrating a first correlation between each of the first potential difference D1 and the second potential difference D2 and the temperature detected by the temperature sensor 50. The vertical axis in FIG. 5 represents the potential difference. The horizontal axis in FIG. 5 represents the temperature detected by the temperature sensor 50, corresponding to the temperature of the first control liquid crystal layer 23.

The magnitude of the first potential difference D1 is larger as the temperature detected by the temperature sensor 50 is lower. The magnitude of the second potential difference D2 is larger as the temperature detected by the temperature sensor 50 is lower. The magnitude of the first potential difference D1 and the magnitude of the second potential difference D2 are different from each other at an optional temperature detected by the temperature sensor 50. Specifically, the magnitude of the first potential difference D1 is larger than the magnitude of the second potential difference D2 at an optional temperature detected by the temperature sensor 50. The second potential difference D2 is a potential difference corresponding to the second view angle θ2. The first correlation is derived in advance through an experiment, a simulation, or the like and stored in advance in the second control circuit 60.

Subsequently at step S2 illustrated in FIG. 4, the second control circuit 60 outputs a first start voltage that generates the first potential difference D1 between the first electrode 24 and the second electrode 25.

In addition, at step S3, the second control circuit 60 determines whether a first time T1 has elapsed since a time point when the first start voltage is output. The first time T1 is a time when the first start voltage is output, and is derived in advance through an experiment, a simulation, or the like and stored in advance in the second control circuit 60. When the first time T1 has not elapsed (NO at step S3), the second control circuit 60 repeatedly executes step S3 and continues outputting of the first start voltage.

When the first time T1 has elapsed (YES at step S3), the second control circuit 60 outputs a first intermediate voltage between the first electrode 24 and the second electrode 25 at step S4. The first intermediate voltage is voltage with which the potential difference between the first electrode 24 and the second electrode 25 gradually changes from the first potential difference D1 to the second potential difference D2.

Subsequently at step S5, the second control circuit 60 determines whether a second time T2 has elapsed since a time point when the first intermediate voltage is output. The second time T2 is a time when the first intermediate voltage is output, and is derived in advance through an experiment, a simulation, or the like and stored in advance in the second control circuit 60. In the present first embodiment, the second time T2 is shorter than the first time T1. The second time T2 may be equal to or longer than the first time T1. When the second time T2 has not elapsed (NO at step S5), the second control circuit 60 repeatedly executes step S5.

When the second time T2 has elapsed (YES at step S5), the second control circuit 60 outputs a first drive voltage that generates the second potential difference D2 between the first electrode 24 and the second electrode 25 at step S6. In other words, the second control circuit 60 outputs the first intermediate voltage from a time point when the first time T1 has elapsed to a time point when the second time T2 has elapsed and outputs the first drive voltage from the time point when the second time T2 has elapsed.

Subsequently at step S7, the second control circuit 60 determines whether the visual recognition signal has been received. When the visual recognition signal has not been received (NO at step S7), the second control circuit 60 repeatedly executes step S7 and continues outputting of the first drive voltage.

When the visual recognition signal has been received (YES at step S7), the second control circuit 60 stops outputting of the first drive voltage at step S8 and ends the program. In other words, when having received the visual recognition signal in the non-visual recognition mode, the second control circuit 60 switches to the visual recognition mode and does not apply voltage between the first electrode 24 and the second electrode 25.

The second control circuit 60 executes a scheme (what is called common inversion scheme) by which the polarity of a common electrode that is one of the first electrode 24 and the second electrode 25 is inverted for each frame, for example.

Figure 6:
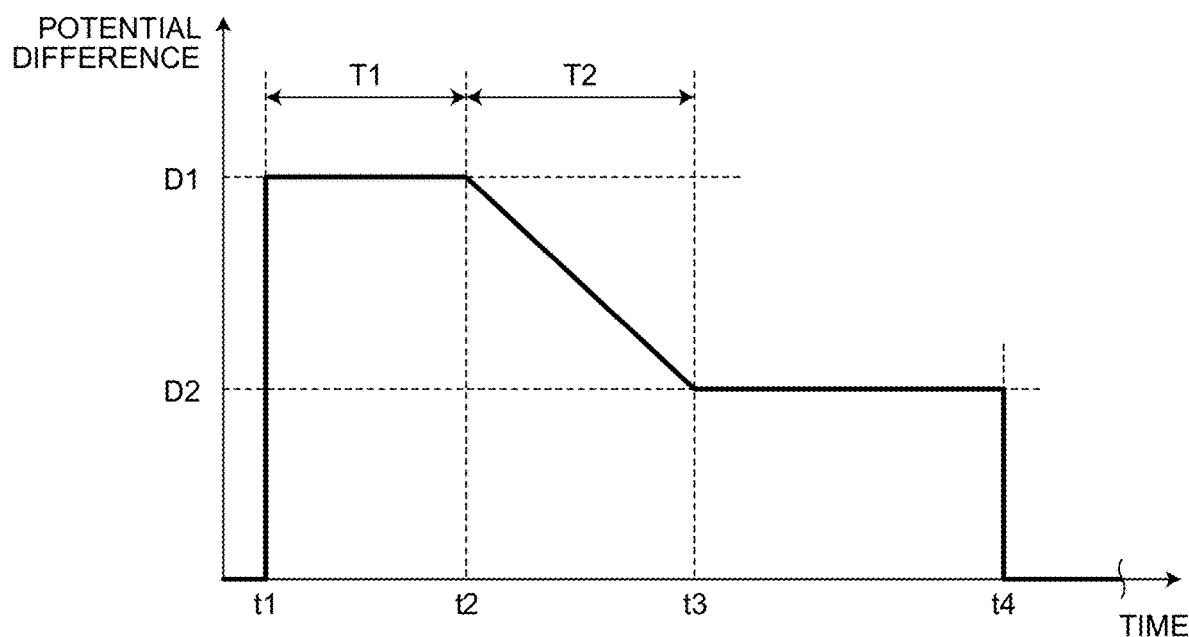
FIG. 6 is a time chart illustrating operation of the view angle control panel when the flowchart illustrated in FIG. 4 is executed by the second control circuit.

FIG. 6 is a time chart illustrating operation of the view angle control panel 20 when the flowchart illustrated in FIG. 4 is executed by the second control circuit 60.

When the non-visual recognition signal is output in a state in which the second control circuit 60 operates in the visual recognition mode and the view angle of the display region DA is the first view angle θ1, the second control circuit 60 switches to the non-visual recognition mode as described above. Accordingly, the first start voltage is output and the first potential difference D1 is generated between the first electrode 24 and the second electrode 25 (time point t1; step S2), the liquid crystal molecules in the first control liquid crystal layer 23 start to tilt from a state in which their long axis is orthogonal to the Z direction. Accordingly, the view angle of the display region DA starts to decrease from the first view angle θ1.

At a time point (time point t2) when the first time T1 has elapsed since a time point when the first start voltage is output, outputting of the first start voltage is stopped and the first intermediate voltage is output (step S4). While the first intermediate voltage is output, the potential difference between the first electrode 24 and the second electrode 25 gradually decreases from the first potential difference D1 to the second potential difference D2, and the response speed of the liquid crystal molecules gradually decreases. Accordingly, the decreasing speed of the view angle of the display region DA gradually decreases.

At a time point (time point t3) when the second time T2 has elapsed since a time point when outputting of the first intermediate voltage is started, outputting of the first intermediate voltage is stopped. At the time point (time point t3) when the second time T2 has elapsed, the potential difference between the first electrode 24 and the second electrode 25 becomes the second potential difference D2.

Then, from the time point (time point t3) when the second time T2 has elapsed, the first drive voltage is output (step S6) and the potential difference between the first electrode 24 and the second electrode 25 is maintained at the second potential difference D2. Accordingly, the view angle of the display region DA becomes the second view angle θ2. While the first drive voltage is output, tilt of the liquid crystal molecules is maintained and the view angle of the display region DA is maintained at the second view angle θ2.

Then, when the visual recognition signal is output and outputting of the first drive voltage is stopped (time point t4; step S8), the liquid crystal molecules tilt and return to the state in which their long axis is orthogonal to the Z direction. Accordingly, the view angle of the display region DA returns to the first view angle θ1.

The following describes a comparative example of the display device 1 according to the present first embodiment with focus on difference from the above-described display device 1. In a display device (not illustrated) according to the comparative example, when having received the non-visual recognition signal and switched from the visual recognition mode to the non-visual recognition mode, the second control circuit 60 outputs the first drive voltage without outputting the first start voltage and the first intermediate voltage. In the display device according to the comparative example, when the first drive voltage is output, the liquid crystal molecules in the first control liquid crystal layer 23 start to tilt from the state in which their long axis is orthogonal to the Z direction and stop at a tilt angle corresponding to the second view angle θ2.

As described above, the second potential difference D2 of the first drive voltage is smaller than the first potential difference D1 of the first start voltage output from the display device 1 according to the present first embodiment. Thus, the response speed of the liquid crystal molecules in the display device according to the comparative example is slower than the response speed of the liquid crystal molecules in the display device 1 according to the present first embodiment. Accordingly, the time of switching from the first view angle θ1 to the second view angle θ2 is later in the display device according to the comparative example than in the display device 1 according to the present first embodiment.

In other words, when the non-visual recognition signal is output and the operation mode of the second control circuit 60 is switched from the visual recognition mode to the non-visual recognition mode in the display device 1 according to the present first embodiment, the first start voltage, the first intermediate voltage, and the first drive voltage are output in the stated order as described above, and accordingly, the response speed of the liquid crystal molecules can be increased as compared to the display device according to the comparative example. Thus, the view angle of the display region DA can be switched from the first view angle θ1 to the second view angle θ2 early.

Moreover, as described above, the magnitude of the first potential difference D1 corresponding to the first start voltage is larger as the temperature detected by the temperature sensor 50 (temperature of the first control liquid crystal layer 23) is lower. The response speed of the liquid crystal molecules increases as the magnitude of the first potential difference D1 is larger. Accordingly, in the display device 1 according to the present first embodiment, the view angle of the display region DA is switched from the first view angle θ1 to the second view angle θ2 early even when the temperature of the first control liquid crystal layer 23 is relatively low. Thus, an image not to be visually recognized by the person M1 can be prevented from being visually recognized by the person M1.

Modification of First Embodiment

The following describes the display device 1 according to a modification of the first embodiment of the present disclosure with focus on difference from the above-described display device 1 according to the first embodiment.

In the above-described display device 1 according to the first embodiment, the second control circuit 60 may output the first drive voltage from the time point (time point t2; refer to FIG. 6) when the first time T1 has elapsed, without outputting the first intermediate voltage. Specifically, when the first time T1 has elapsed (YES at step S3) in the flowchart illustrated in FIG. 4, the second control circuit 60 executes step S6 to output the first drive voltage without executing steps S4 and S5. In other words, the second control circuit 60 outputs the first drive voltage that generates the second potential difference D2 between the first electrode 24 and the second electrode 25 at or after the time point when the first time T1 has elapsed since the time point when outputting of the first start voltage is started.

In the above-described display device 1 according to the first embodiment, steps S2 and S3 illustrated in FIG. 4 do not necessarily need to be executed. In this case, after having determined the first potential difference D1 and the second potential difference D2 at step S1, the second control circuit 60 outputs the first intermediate voltage at step S4 without outputting the first start voltage.

In the above-described display device 1 according to the first embodiment, the first potential difference D1 may be a predetermined value irrespective of the temperature detected by the temperature sensor 50. In this case, at step S1 illustrated in FIG. 4, the second control circuit 60 may determine the first time T1 and the second time T2 based on the temperature detected by the temperature sensor 50.

Figure 7:
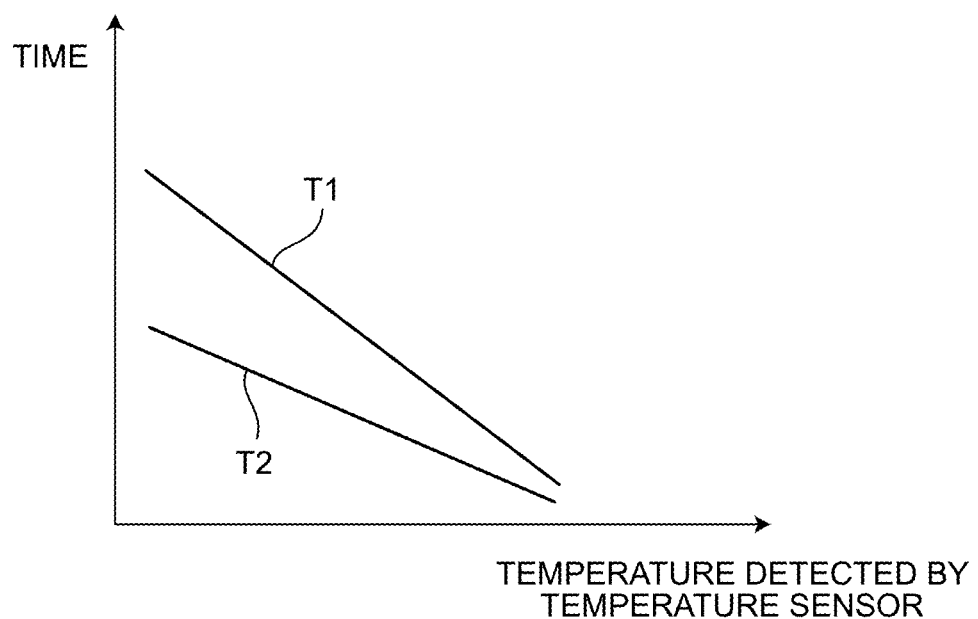
FIG. 7 is a diagram illustrating a second correlation between each of first and second times and the temperature detected by the temperature sensor in the display device according to a modification of the first embodiment of the present disclosure.

FIG. 7 is a diagram illustrating a second correlation between the temperature detected by the temperature sensor 50 and each of the first time T1 and the second time T2 in the display device 1 according to the modification of the first embodiment of the present disclosure.

The first time T1 is longer as the temperature detected by the temperature sensor 50 is lower. The second time T2 is longer as the temperature detected by the temperature sensor 50 is lower. The first time T1 and the second time T2 are different from each other at an optional temperature detected by the temperature sensor 50. Specifically, the first time T1 is longer than the second time T2 at an optional temperature detected by the temperature sensor 50. The second correlation is derived in advance through an experiment, a simulation, or the like and stored in advance in the second control circuit 60. In the present modification, the first time T1 may be equal to or shorter than the second time T2 at an optional temperature detected by the temperature sensor 50.

In the above-described display device 1 according to the first embodiment, it may be set that the magnitude of the first potential difference D1 is larger than the magnitude of the second potential difference D2 as described above when the temperature detected by the temperature sensor 50 is equal to or lower than room temperature (equal to or higher than 5° C. and equal to or lower than 35° C.), and the magnitude of the first potential difference D1 is smaller than the magnitude of the second potential difference D2 when the temperature detected by the temperature sensor 50 is higher than room temperature. In this case, a time in which the view angle of the display region DA switches from the first view angle θ1 to the second view angle θ2 can be kept constant over the entire use temperature of the display device 1.

In the above-described display device 1 according to the first embodiment, it may be set that the magnitude of the first potential difference D1 is larger than the magnitude of the second potential difference D2 as described above when the temperature detected by the temperature sensor 50 is lower than room temperature, and the magnitude of the first potential difference D1 is smaller than the magnitude of the second potential difference D2 when the temperature detected by the temperature sensor 50 is equal to or higher than room temperature. In this case, a time in which the view angle of the display region DA switches from the first view angle θ1 to the second view angle θ2 can be kept constant in a relatively late state over the entire use temperature of the display device 1.

Second Embodiment

The following describes the display device 1 according to a second embodiment of the present disclosure with focus on difference from the above-described display device 1 according to the first embodiment.

Figure 8:
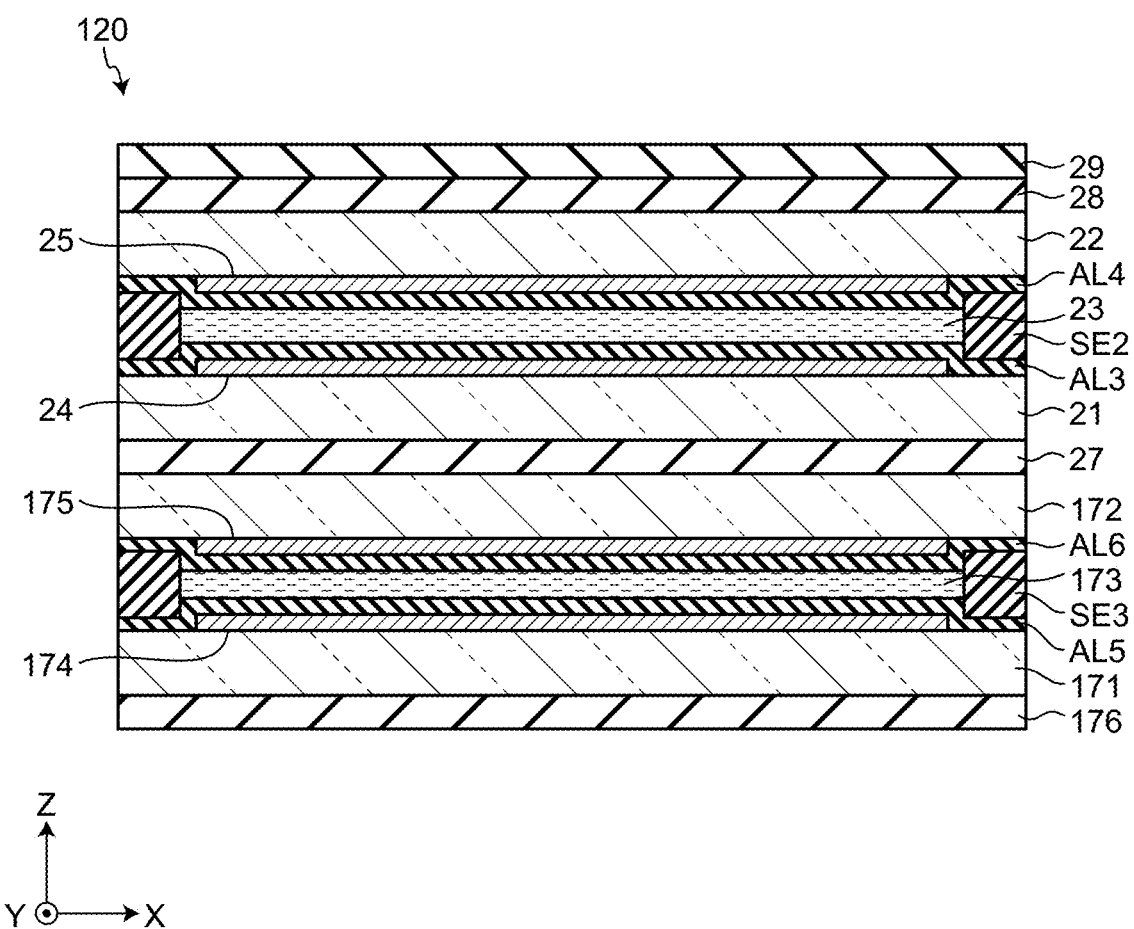
FIG. 8 is a sectional view of the view angle control panel in the display device according to a second embodiment of the present disclosure.

FIG. 8 is a sectional view of a view angle control panel 120 in the display device 1 according to the second embodiment of the present disclosure. The view angle control panel 120 according to the present second embodiment further includes a third control board 171, a fourth control board 172 disposed facing the third control board 171, and a second control liquid crystal layer 173 positioned between the third control board 171 and the fourth control board 172.

The third control board 171 is positioned on the back surface side of the fourth control board 172. An alignment film AL5 and a third electrode 174 are disposed on the front surface side of the third control board 171. The alignment film AL5 contacts the second control liquid crystal layer 173. The third electrode 174 has a single-sheet shape and is disposed between the third control board 171 and the alignment film AL5. The third electrode 174 overlaps the effective region AA in a plan view.

An alignment film AL6 and a fourth electrode 175 are disposed on the back surface side of the fourth control board 172. The alignment film AL6 contacts the second control liquid crystal layer 173. The front surface side of the fourth control board 172 is disposed on the back surface side of the third polarization plate 27.

The fourth electrode 175 is disposed between the fourth control board 172 and the alignment film AL6. The fourth electrode 175 is disposed facing the third electrode 174. The fourth electrode 175 overlaps the effective region AA in a plan view.

The third control board 171 and the fourth control board 172 are made of, for example, glass or resin and are translucent. The third electrode 174 and the fourth electrode 175 are made of a conductive material such as indium tin oxide (ITO) or indium zinc oxide (IZO) and are translucent.

The alignment films AL5 and AL6 are horizontal alignment films having alignment regulation force parallel to the XY plane.

The view angle control panel 120 further includes a seal SE3 that seals liquid crystal molecules in the second control liquid crystal layer 173. Similarly to the first control liquid crystal layer 23, the second control liquid crystal layer 173 has optical rotatory power that rotates the polarization axis of a polarization component of linearly polarized light. The second control liquid crystal layer 173 overlaps the first control liquid crystal layer 23 in a plan view. The thickness (in other words, length in the Z direction) of the first control liquid crystal layer 23 is larger than the thickness of the second control liquid crystal layer 173.

The view angle control panel 120 further includes a fifth polarization plate 176. The fifth polarization plate 176 is disposed on the back surface side of the third control board 171. The transmission axis of the fifth polarization plate 176 is orthogonal to each of the Z direction and the transmission axis of the third polarization plate 27.

The following describes a state in which no voltage is applied to the second control liquid crystal layer 173. The long axis of each liquid crystal molecule contained in the second control liquid crystal layer 173 is orthogonal to the Z direction in a state in which no voltage is applied to the second control liquid crystal layer 173. Accordingly, the traveling direction of light does not change in the second control liquid crystal layer 173.

However, in a state in which voltage is applied to the second control liquid crystal layer 173, the long axis of each liquid crystal molecule contained in the second control liquid crystal layer 173 is not orthogonal to the Z direction but tilts relative to the XY plane. The operation of the liquid crystal molecules, involving tilt of their long axis becomes slower as the temperature of the second control liquid crystal layer 173 decreases.

As the long axis of the liquid crystal molecules tilts, light is refracted in accordance with the tilt of the long axis of the liquid crystal molecules in the second control liquid crystal layer 173.

Light having transmitted through the second control liquid crystal layer 173 is incident on the first control liquid crystal layer 23. When voltage is applied to the second control liquid crystal layer 173, voltage is also applied to the first control liquid crystal layer 23 as described later. Accordingly, light transmitting through the first control liquid crystal layer 23 is refracted in accordance with the tilt of the long axis of the liquid crystal molecules in the first control liquid crystal layer 23.

In this manner, when voltage is applied to the first control liquid crystal layer 23 and the second control liquid crystal layer 173, the view angle of the display region DA decreases in the display region DA. In other words, the person M1 on the driver seat has difficulty visually recognizing an image. In this manner, the view angle of the display region DA is switched depending on voltage applied to the second control liquid crystal layer 173 in the view angle control panel 120.

In the view angle control panel 120 according to the present second embodiment, light is refracted in the first control liquid crystal layer 23 and the second control liquid crystal layer 173. Thus, when the view angle of the display region DA is the second view angle θ2, the tilt angle of each of the liquid crystal molecules in the first control liquid crystal layer 23 and the liquid crystal molecules in the second control liquid crystal layer 173 can be made smaller than the tilt angle of the liquid crystal molecules in the first control liquid crystal layer 23 in the first embodiment described above.

The second control circuit 60 controls the view angle control panel 120 based on a switching signal transmitted from the external device and switches the view angle of the display region DA by voltage applied to the first control liquid crystal layer 23 and the second control liquid crystal layer 173 as described above.

Specifically, when having received the visual recognition signal, the second control circuit 60 sets the potential difference between the third electrode 174 and the fourth electrode 175 to zero. In other words, in the visual recognition mode, the second control circuit 60 does not apply voltage between the third electrode 174 and the fourth electrode 175. In addition, in the visual recognition mode, the second control circuit 60 does not apply voltage between the first electrode 24 and the second electrode 25 as in the above-described first embodiment.

Accordingly, in the visual recognition mode, no voltage is applied to any of the first control liquid crystal layer 23 and the second control liquid crystal layer 173, and as described above, the view angle of the display region DA is the first view angle θ1 and an image displayed in the display region DA can be visually recognized by both the person M1 on the driver seat and the person M2 on the front passenger seat.

When having been received the non-visual recognition signal, the second control circuit 60 switches to the non-visual recognition mode and executes the flowchart illustrated in FIG. 4 to output voltage that generates a potential difference larger than zero between the first electrode 24 and the second electrode 25, and also outputs voltage that generates a potential difference larger than zero between the third electrode 174 and the fourth electrode 175, as described next.

Figure 9:
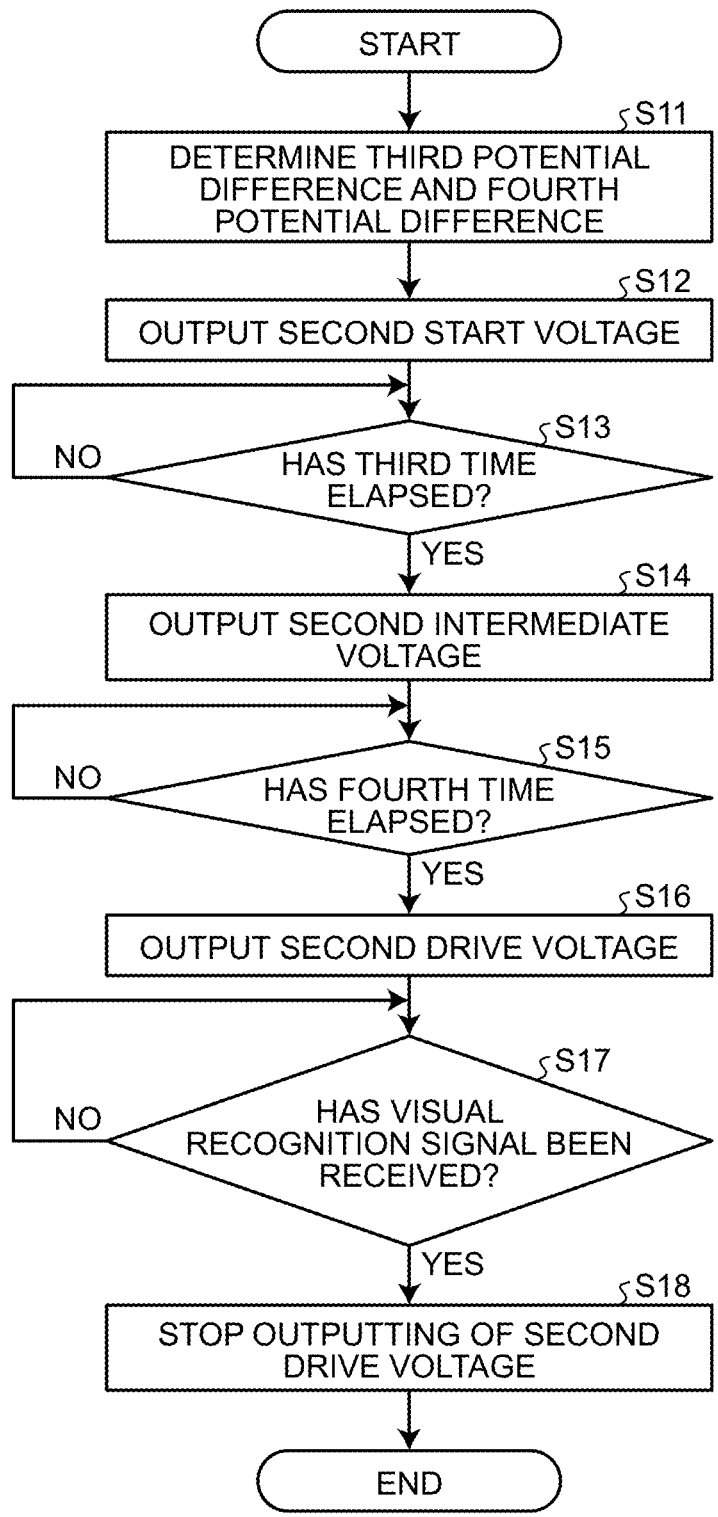
FIG. 9 is a flowchart executed by the second control circuit according to the second embodiment of the present disclosure at switching from the visual recognition mode to the non-visual recognition mode.

FIG. 9 is a flowchart executed by the second control circuit 60 according to the second embodiment of the present disclosure at switching from the visual recognition mode to the non-visual recognition mode. When having received the non-visual recognition signal while operating in the visual recognition mode, the second control circuit 60 switches from the visual recognition mode to the non-visual recognition mode and executes the flowchart illustrated in FIG. 4 and the flowchart illustrated in FIG. 9 in parallel.

At step S11, the second control circuit 60 determines a third potential difference D3 and a fourth potential difference D4 based on the temperature detected by the temperature sensor 50. In the present second embodiment, the second potential difference D2 and the fourth potential difference D4 are determined so that the view angle of the display region DA is the second view angle θ2 when the potential difference between the first electrode 24 and the second electrode 25 is the second potential difference D2 and the potential difference between the third electrode 174 and the fourth electrode 175 is the fourth potential difference D4.

Figure 10:
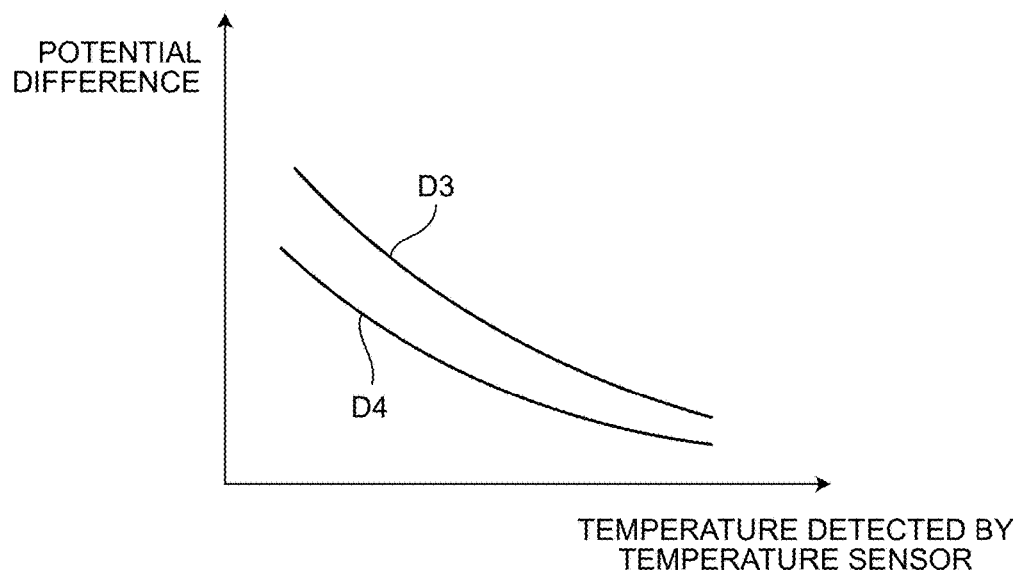
FIG. 10 is a diagram illustrating a third correlation between each of third and fourth potential differences and the temperature detected by the temperature sensor.

FIG. 10 is a diagram illustrating a third correlation between each of the third potential difference D3 and the fourth potential difference D4 and the temperature detected by the temperature sensor 50. The vertical axis in FIG. 10 represents the potential difference. The horizontal axis in FIG. 10 represents the temperature detected by the temperature sensor 50. The view angle control panel 120 is integrated as illustrated in FIG. 8, and the temperature of the first control liquid crystal layer 23 and the temperature of the second control liquid crystal layer 173 are substantially equal to each other. Accordingly, the temperature detected by the temperature sensor 50 corresponds to the temperature of the second control liquid crystal layer 173. In the present second embodiment, the temperature sensor 50 may be disposed on the third control board 171.

The magnitude of the third potential difference D3 is larger as the temperature detected by the temperature sensor 50 is lower. The magnitude of the fourth potential difference D4 is larger as the temperature detected by the temperature sensor 50 is lower. The magnitude of the third potential difference D3 and the magnitude of the fourth potential difference D4 are different from each other at an optional temperature detected by the temperature sensor 50. Specifically, the magnitude of the third potential difference D3 is larger than the magnitude of the fourth potential difference D4 at an optional temperature detected by the temperature sensor 50.

Moreover, the magnitude of the third potential difference D3 is smaller than the magnitude of the first potential difference D1 at an optional temperature detected by the temperature sensor 50. The magnitude of the fourth potential difference D4 is smaller than the magnitude of the second potential difference D2 at an optional temperature detected by the temperature sensor 50. The third correlation is derived in advance through an experiment, a simulation, or the like and stored in advance in the second control circuit 60.

Subsequently at step S12 illustrated in FIG. 9, the second control circuit 60 outputs a second start voltage that generates the third potential difference D3 between the third electrode 174 and the fourth electrode 175.

In addition, at step S13, the second control circuit 60 determines whether a third time T3 has elapsed since a time point when the second start voltage is output. The third time T3 is a time when the second start voltage is output, and derived in advance through an experiment, a simulation, or the like and stored in advance in the second control circuit 60. In the present second embodiment, the third time T3 is shorter than the first time T1. The third time T3 may be equal to or longer than the first time T1. When the third time T3 has not elapsed (NO at step S13), the second control circuit 60 repeatedly executes step S13 and continues outputting of the second start voltage.

When the third time T3 has elapsed (YES at step S13), the second control circuit 60 outputs a second intermediate voltage between the third electrode 174 and the fourth electrode 175 at step S14. The second intermediate voltage is voltage with which the potential difference between the third electrode 174 and the fourth electrode 175 gradually changes from the third potential difference D3 to the fourth potential difference D4.

Subsequently at step S15, the second control circuit 60 determines whether a fourth time T4 has elapsed since a time point when the second intermediate voltage is output. The fourth time T4 is a time when the second intermediate voltage is output, and derived in advance through an experiment, a simulation, or the like and stored in advance in the second control circuit 60.

In the present second embodiment, the fourth time T4 is shorter than the second time T2. Moreover, the sum of the third time T3 and the fourth time T4 is determined such that a time until the tilt angle of the liquid crystal molecules in the second control liquid crystal layer 173 becomes an angle corresponding to the second view angle θ2 is equal to a time until the tilt angle of the liquid crystal molecules in the first control liquid crystal layer 23 becomes an angle corresponding to the second view angle θ2. In the present second embodiment, the sum of the third time T3 and the fourth time T4 is equal to the sum of the first time T1 and the second time T2. The sum of the third time T3 and the fourth time T4 may be different from the sum of the first time T1 and the second time T2.

When the fourth time T4 has not elapsed (NO at step S15), the second control circuit 60 repeatedly executes step S15.

When the fourth time T4 has elapsed (YES at step S15), the second control circuit 60 outputs a second drive voltage that generates the fourth potential difference D4 between the third electrode 174 and the fourth electrode 175 at step S16. In other words, the second control circuit 60 outputs the second intermediate voltage from a time point when the third time T3 has elapsed to a time point when the fourth time T4 has elapsed, and outputs the second drive voltage from the time point when the fourth time T4 has elapsed.

Subsequently at step S17, the second control circuit 60 determines whether the visual recognition signal has been received. When the visual recognition signal has not been received (NO at step S17), the second control circuit 60 repeatedly executes step S17 and continues outputting of the second drive voltage.

When the visual recognition signal has been received (YES at step S17), the second control circuit 60 stops outputting of the second drive voltage at step S18 and ends the program. In this manner, when having received the visual recognition signal in the non-visual recognition mode, the second control circuit 60 ends the program illustrated in FIGS. 4 and 9. Accordingly, the second control circuit 60 switches to the visual recognition mode and does not apply voltage between the first electrode 24 and the second electrode 25 nor between the third electrode 174 and the fourth electrode 175.

The second control circuit 60 executes a scheme (what is called common inversion scheme) by which the polarity of a common electrode that is one of the third electrode 174 and the fourth electrode 175 is inverted for each frame, for example.

Figure 11:
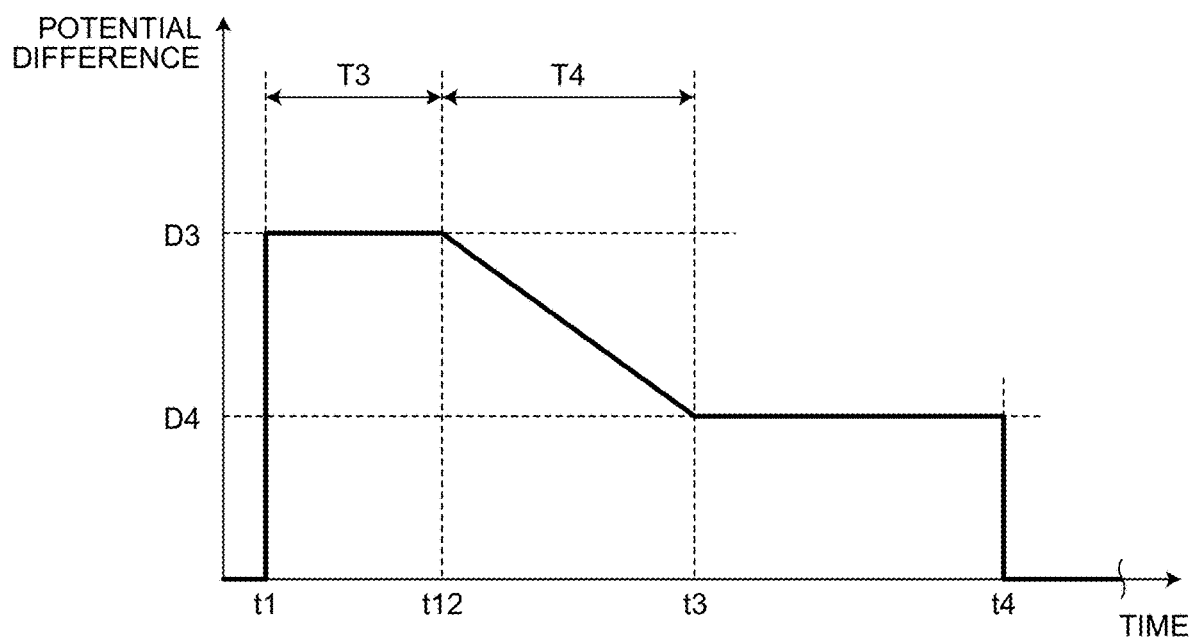
FIG. 11 is a time chart illustrating operation of the view angle control panel when the flowchart illustrated in FIG. 9 is executed by the second control circuit.

FIG. 11 is a time chart illustrating operation of the view angle control panel 120 when the flowchart illustrated in FIG. 9 is executed by the second control circuit 60. As described above, the second control circuit 60 executes the flowchart illustrated in FIG. 4 in parallel when executing the flowchart illustrated in FIG. 9, and the potential difference between the first electrode 24 and the second electrode 25 changes as in the time chart illustrated in FIG. 6. The following description will be focused on the potential difference between the third electrode 174 and the fourth electrode 175.

When the non-visual recognition signal is output in a state in which the second control circuit 60 operates in the visual recognition mode and the view angle of the display region DA is the first view angle θ1, the second control circuit 60 switches to the non-visual recognition mode as described above. Accordingly, the second start voltage is output and the third potential difference D3 is generated between the third electrode 174 and the fourth electrode 175 (time point t1; step S12), the liquid crystal molecules in the second control liquid crystal layer 173 start to tilt. Accordingly, the view angle of the display region DA starts to decrease from the first view angle θ1.

At a time point (time point t12) when the third time T3 has elapsed since a time point when the second start voltage is output, outputting of the second start voltage is stopped and the second intermediate voltage is output (step S14). While the second intermediate voltage is output, the potential difference between the third electrode 174 and the fourth electrode 175 gradually decreases from the third potential difference D3 to the fourth potential difference D4, and the response speed of the liquid crystal molecules gradually decreases. Accordingly, the decreasing speed of the view angle of the display region DA gradually decreases.

At a time point (time point t3) when the fourth time T4 has elapsed since a time point when outputting of the second intermediate voltage is started, outputting of the second intermediate voltage is stopped. At the time point (time point t3) when the fourth time T4 has elapsed, the potential difference between the third electrode 174 and the fourth electrode 175 becomes the fourth potential difference D4.

Then, from the time point (time point t3) when the fourth time T4 has elapsed, the second drive voltage is output (step S16) and the potential difference between the third electrode 174 and the fourth electrode 175 is maintained at the fourth potential difference D4. Accordingly, the view angle of the display region DA becomes the second view angle θ2. While the second drive voltage is output, the tilt of the liquid crystal molecules is maintained and the view angle of the display region DA is maintained at the second view angle θ2.

Then, when the visual recognition signal is output and outputting of the second drive voltage is stopped (time point t4; step S18), the liquid crystal molecules tilt and return to the state in which their long axis is orthogonal to the Z direction. Accordingly, the view angle of the display region DA returns to the first view angle θ1.

As described above, the thickness of the first control liquid crystal layer 23 is larger than the thickness of the second control liquid crystal layer 173. Accordingly, when electric fields generated by potential differences of the same magnitude act on the first control liquid crystal layer 23 and the second control liquid crystal layer 173, respectively, the response speed of the liquid crystal molecules in the first control liquid crystal layer 23 is slower than the response speed of the liquid crystal molecules in the second control liquid crystal layer 173. Moreover, as described above, the magnitude of the first potential difference D1 generated by the first start voltage applied to the first control liquid crystal layer 23 is larger than the magnitude of the third potential difference D3 generated by the second start voltage applied to the second control liquid crystal layer 173. Accordingly, the timing of switching from the liquid crystal molecule tilt angle corresponding to the first view angle θ1 to the liquid crystal molecule tilt angle corresponding to the second view angle θ2 is the same for both the first control liquid crystal layer 23 and the second control liquid crystal layer 173. In other words, the first potential difference D1, the second potential difference D2, the third potential difference D3, and the fourth potential difference D4 are determined so that the timing of switching from the liquid crystal molecule tilt angle corresponding to the first view angle θ1 to the liquid crystal molecule tilt angle corresponding to the second view angle θ2 is the same for both the first control liquid crystal layer 23 and the second control liquid crystal layer 173.

In the present second embodiment, since the view angle control panel 120 includes the first control liquid crystal layer 23 and the second control liquid crystal layer 173, as described above, the tilt angle of the liquid crystal molecules in the first control liquid crystal layer 23 and the tilt angle of the liquid crystal molecules in the second control liquid crystal layer 173 at the second view angle θ2 in the present second embodiment can be made smaller than the tilt angle of the liquid crystal molecules in the first control liquid crystal layer 23 in the above-described first embodiment. Accordingly, in the present second embodiment, the sum of the first time T1 and the second time T2 (in other words, the sum of the third time T3 and the fourth time T4) can be made shorter than the sum of the first time T1 and the second time T2 in the above-described first embodiment to switch from the first view angle θ1 to the second view angle θ2 at an earlier timing. Thus, an image not to be visually recognized by the person M1 can be further prevented from being visually recognized by the person M1.

Modification of Second Embodiment

The following describes the display device 1 according to a modification of the second embodiment of the present disclosure with focus on difference from the above-described display device 1 according to the second embodiment.

In the above-described display device 1 according to the second embodiment, the third potential difference D3 may be equal to the first potential difference D1. In this case, the first time T1 may be longer than the third time T3, and the sum of the first time T1 and the second time T2 may be longer than the sum of the third time T3 and the fourth time T4.

The second control circuit 60 may output the second drive voltage from the time point when the third time T3 has elapsed, without outputting the second intermediate voltage. Specifically, in the flowchart illustrated in FIG. 9, when the third time T3 has elapsed (YES at step S13), the second control circuit 60 executes step S16 to output the second drive voltage without executing steps S14 and S15. In other words, the second control circuit 60 outputs the second drive voltage that generates the fourth potential difference D4 between the third electrode 174 and the fourth electrode 175 at or after the time point when the third time T3 has elapsed since the time point when outputting of the second start voltage is started.

In the above-described display device 1 according to the second embodiment, steps S12 and S13 illustrated in FIG. 9 do not necessarily need to be executed. In this case, after having determined the third potential difference D3 and the fourth potential difference D4 at step S1, the second control circuit 60 outputs the second intermediate voltage at step S14 without outputting the second start voltage.

The thickness of the first control liquid crystal layer 23 may be smaller than the thickness of the second control liquid crystal layer 173. In this case, at an optional temperature detected by the temperature sensor 50, the magnitude of the third potential difference D3 may be smaller than the magnitude of the first potential difference D1, and the magnitude of the fourth potential difference D4 may be smaller than the magnitude of the second potential difference D2.

In the above-described display device 1 according to the second embodiment, the third potential difference D3 may be a predetermined value irrespective of the temperature detected by the temperature sensor 50. In this case, at step S1 illustrated in FIG. 9, in the above-described display device 1 according to the second embodiment, the second control circuit 60 may determine the third time T3 and the fourth time T4 based on the temperature detected by the temperature sensor 50.

Figure 12:
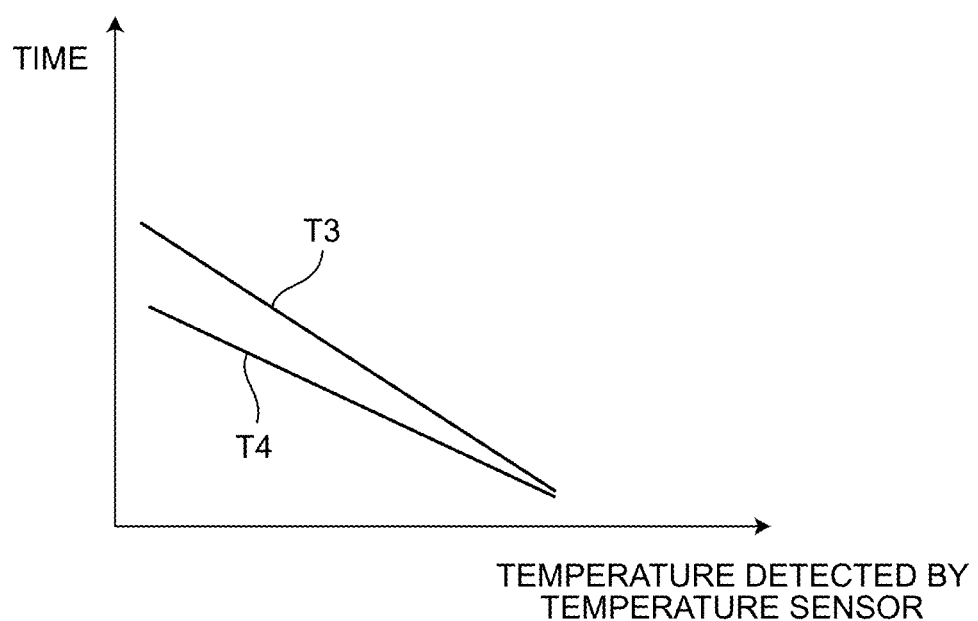
FIG. 12 is a diagram illustrating a fourth correlation between each of third and fourth times and the temperature detected by the temperature sensor in the display device according to a modification of the second embodiment of the present disclosure.

FIG. 12 is a diagram illustrating a fourth correlation between the temperature detected by the temperature sensor 50 and each of the third time T3 and the fourth time T4 in the display device 1 according to the modification of the second embodiment of the present disclosure.

The third time T3 is longer as the temperature detected by the temperature sensor 50 is lower. The fourth time T4 is longer as the temperature detected by the temperature sensor 50 is lower. The third time T3 and the fourth time T4 are different from each other at an optional temperature detected by the temperature sensor 50. Specifically, the third time T3 is longer than the fourth time T4 at an optional temperature detected by the temperature sensor 50. The fourth correlation is derived in advance through an experiment, a simulation, or the like and stored in advance in the second control circuit 60. In the present modification, the third time T3 may be equal to or shorter than the fourth time T4 at an optional temperature detected by the temperature sensor 50.

In the above-described display device 1 according to the second embodiment, it may be set that the magnitude of the third potential difference D3 is larger than the magnitude of the fourth potential difference D4 as described above when the temperature detected by the temperature sensor 50 is equal to or lower than room temperature, and the magnitude of the third potential difference D3 is smaller than the magnitude of the fourth potential difference D4 when the temperature detected by the temperature sensor 50 is higher than room temperature. In this case, a time in which the view angle of the display region DA switches from the first view angle θ1 to the second view angle θ2 can be kept constant over the entire use temperature of the display device 1.

In the above-described display device 1 according to the second embodiment, it may be set that the magnitude of the third potential difference D3 is larger than the magnitude of the fourth potential difference D4 as described above when the temperature detected by the temperature sensor 50 is lower than room temperature, and the magnitude of the third potential difference D3 is smaller than the magnitude of the fourth potential difference D4 when the temperature detected by the temperature sensor 50 is equal to or higher than room temperature. In this case, a time in which the view angle of the display region DA switches from the first view angle θ1 to the second view angle θ2 can be kept constant in a relatively late state over the entire use temperature of the display device 1.

Other Modifications

Preferable embodiments of the present invention are described above, but the present invention is not limited to such embodiments. Contents disclosed in the embodiments are merely exemplary, and various kinds of modifications are possible without departing from the scope of the present invention. Any modification performed as appropriate without departing from the scope of the present invention belongs to the technical scope of the present invention. At least one of various kinds of omission, replacement, and modification of any constituent component may be performed without departing from the scope of the above-described embodiments and modifications.

For example, the view angle control panels 20 and 120 may control the view angle in a direction intersecting the X direction.

It should be understood that the present disclosure provides any other effects achieved by aspects described above in the present embodiment, such as effects that are clear from the description of the present specification or effects that could be thought of by the skilled person in the art as appropriate.

The visual recognition mode corresponds to a "first mode", and the non-visual recognition mode corresponds to a "second mode". The view angle control panel 20 corresponds to an "electro-optical device". The first control board 21 corresponds to a "first substrate", and the second control board 22 corresponds to a "second substrate". The third control board 171 corresponds to a "third substrate", and the fourth control board 172 corresponds to a "fourth substrate". The first control liquid crystal layer 23 corresponds to a "first liquid crystal layer", and the second control liquid crystal layer 173 corresponds to a "second liquid crystal layer". The second control circuit 60 corresponds to a "control circuit". The first intermediate voltage corresponds to an "intermediate voltage".

What is claimed is:

1. An electro-optical device comprising:
   a first substrate including a first electrode;
   a second substrate including a second electrode and disposed facing the first substrate, the second electrode facing the first electrode;
   a first liquid crystal layer positioned between the first electrode and the second electrode;
   a temperature sensor configured to detect a temperature of the first liquid crystal layer; and
   a control circuit configured to operate in one of a first mode in which the potential difference between the first electrode and the second electrode is set to zero and a second mode in which a potential difference larger than zero is generated between the first electrode and the second electrode, wherein
   when switching from the first mode to the second mode, the control circuit determines a first potential difference and a second potential difference based on the temperature detected by the temperature sensor, the second potential difference having a magnitude different from a magnitude of the first potential difference, outputs a first start voltage that causes the first potential difference to be generated between the first and second electrodes, and outputs a first drive voltage that causes the second potential difference to be generated between the first and second electrodes at or after a time point when a first time has elapsed since a time point when the output of the first start voltage is started.

2. The electro-optical device according to claim 1, wherein the magnitude of the first potential difference is larger than the magnitude of the second potential difference.

3. The electro-optical device according to claim 1, wherein the magnitude of the first potential difference is larger as the temperature detected by the temperature sensor is lower.

4. The electro-optical device according to claim 1, wherein the first time is longer as the temperature detected by the temperature sensor is lower.

5. The electro-optical device according to claim 1, wherein the control circuit
   outputs an intermediate voltage that gradually changes the potential difference between the first and second electrodes from the first potential difference to the second potential difference from the time point when the first time has elapsed to a time point when a second time having a duration different from the duration of the first time has elapsed, and
   outputs the first drive voltage from the time point when the second time has elapsed.

6. The electro-optical device according to claim 5, wherein the second time is longer as the temperature detected by the temperature sensor is lower.

7. The electro-optical device according to claim 1, further comprising:
   a third substrate including a third electrode;

a fourth substrate including a fourth electrode and disposed facing the third substrate, the fourth electrode facing the third electrode; and a second liquid crystal layer positioned between the third and fourth electrodes, wherein the first liquid crystal layer overlaps the second liquid crystal layer in a plan view, the thickness of the first liquid crystal layer is larger than the thickness of the second liquid crystal layer, and when switching from the first mode to the second mode, the control circuit determines a third potential difference and a fourth potential difference based on the temperature detected by the temperature sensor, the third potential difference having a magnitude smaller than the magnitude of the first potential difference, the fourth potential difference having a magnitude different from the magnitude of the third potential difference, outputs a second start voltage that causes the third potential difference to be generated between the third and fourth electrodes from the time point when the output of the first start voltage is started, and outputs a second drive voltage that causes the fourth potential difference to be generated between the third and fourth electrodes at or after a time point when a third time having a duration different from the duration of the first time has elapsed since a time point when the output of the second start voltage is started.

8. A display device comprising:

the electro-optical device according to of claim 1; and a display panel including a display region, wherein the electro-optical device overlaps the entire display region in a plan view.

* * * * *